US005281784A

United States Patent [19]

Kuhn

[11] Patent Number: 5,281,784

[45] Date of Patent: Jan. 25, 1994

[54] MOLD ASSEMBLY FOR MICROWAVE OVEN

[76] Inventor: James O. Kuhn, 140 Nassau St., New York, N.Y. 10038

[21] Appl. No.: 16

[22] Filed: Jan. 4, 1993

[51] Int. Cl.[5] .......... H02B 6/80

[52] U.S. Cl. .......... 219/10.55 F; 219/10.55 R; 264/26; 425/174.8 R

[58] Field of Search .......... 219/10.55 F, 10.55 E, 219/10.55 R, 10.55 M; 264/25, 26, 27; 425/174.8 R, 174.8 E, 174

[56] References Cited

U.S. PATENT DOCUMENTS

| | | | |
|---|---|---|---|
| 3,420,923 | 1/1969 | Ashworth et al. | 219/10.55 M |
| 3,429,359 | 2/1969 | Hollingsworth | 219/10.55 M |
| 4,822,966 | 4/1989 | Matsubara | 219/10.55 F |
| 4,882,463 | 11/1989 | Kyougoku et al. | 219/10.55 E |
| 4,933,526 | 6/1990 | Fisher et al. | 219/10.55 E |
| 4,965,424 | 10/1990 | Bagley | 219/10.55 E |
| 5,057,659 | 10/1991 | Schneider et al. | 219/10.55 E |

*Primary Examiner*—Philip H. Leung

*Attorney, Agent, or Firm*—Michael Ebert

[57] ABSTRACT

A mold assembly for use by children to produce in a microwave oven plastic play pieces. The assembly includes a mold, non-reactive to microwave energy and is provided with shaped cavities for receiving a flowable, plastic molding composition non-reactive to microwave energy and having a predetermined curing temperature. Underlying the cavities is a thermal heating element formed by microwave energy-absorbing ferrite particles dispersed in an inert matrix. The particles have a Curie point higher than the curing temperature of the molding composition so that the heating element heats the composition in the mold cavities to effect curing and hardening thereof, thereby forming the play pieces. The mold assembly is enclosed within a safety container non-reactive to microwave energy. The container is provided with a removable cover and a temperature-responsible latching mechanism which releases the cover to permit withdrawal of the mold assembly only when its temperature is reduced to a level at which it is safe to handle.

6 Claims, 2 Drawing Sheets

MOLD ASSEMBLY FOR MICROWAVE OVEN

BACKGROUND OF INVENTION

1. Field of Invention

This invention relates generally to the molding of plastic objects, and more particularly to a mold assembly usable by children to produce in a microwave oven plastic play pieces, and to a safety container for housing the mold assembly to prevent access thereto until the assembly has cooled to a temperature at which it is safe to handle.

2. Status of Prior Art

Plastics are organic substances made synthetically by polymerization and capable of being formed or molded into various products. The term "resin" is generally applied to the initially made polymeric material, whereas the term "plastic" is normally reserved for products made from resin which incorporates other materials, such as fillers, coloring agents, anti-oxidants and plasticizers.

The present invention, which is directed to the molding of plastic objects, uses for this purpose any resin incorporating a substance rendering the resulting composition flowable so that it can be poured into the cavity of a mold and then heated to a temperature at which the plastic cures and hardens to form a molded plastic piece. The Curie temperature is that temperature at which a resin undergoes curing, which is the process by which the hot liquid resin sets to a solid at the same temperature. The amount of time it takes for curing to occur depends on the nature of the composition.

By way of example, the invention will be described in connection with a plastisol having any predetermined curing temperature. It is to be understood, however, that the invention encompasses the use of a plastic molding composition having the necessary characteristics and is not limited to plastisols.

A plastisol is a dispersion of finely divided resin in a plasticizer such as an organic, non-volatile liquid. Plastisols are commonly used in molding thermoplastic resins, chiefly polyvinyl chloride (PVC). Thus, to produce a molded PVC piece, the plastisol is poured into the cavity of a mold, and the mold is placed in an oven in which the plastisol is heated to an elevated temperature whose level depends on the curing point of the plastisol; that is, the temperature at which the plastisol cures and hardens to form a solid plastic piece whose form conforms to the shape of the mold.

The concern of the present invention is with a mold assembly usable by children to produce in a standard microwave oven normally intended to heat and cook food, molded plastic play pieces. It is essential, therefore, that the nature of the assembly be such that it can be safely handled by a child even though the elevated temperature necessary to carry out a molding operation can be injurious, unless the child is shielded from the hot mold.

Taken into account in the invention is that a child is not in a position to set a microwave oven so that it is turned off automatically when the molded plastic pieces within the oven have cured and hardened. The child has no knowledge of the curing temperature of the plastic composition being molded, nor can he see within the oven to determine whether the pieces are finished. And after molding has been completed within the microwave oven and the oven is turned off, the mold containing the plastic pieces is still very hot, and a child would be ill advised to then try to take the mold out of the oven.

The use of microwave ovens to heat or cook food is now commonplace, and microwave ovens are installed in many households. In the typical microwave oven, a magnetron functions to generate microwave energy at a frequency of about 1000 mHz. This energy is conveyed by a wave guide to the interior of the oven to irradiate the food placed therein. Because food absorbs microwave energy, this gives rise to internal molecular friction which heats the food at a rate that depends on its "lossy" characteristics. Some food products are heated more rapidly than others in a microwave oven; but in general the cooking or heating of food by microwave energy is much faster than by conventional heating techniques, including infrared radiation. In heating or cooking food in a microwave oven, the food is placed in a receptacle of synthetic plastic, glass or other material which is non-reactive to microwave energy; hence, it is only the food that is heated.

U.S. Pat. No. 3,941,967 discloses a microwave cooking apparatus capable of scorching the surface of the food being cooked without excessively heating the interior of the food. This apparatus, which is put into a microwave oven, is in the form of a casing, within which is disposed a plate in which is placed the food to be cooked. Below the plate is a thermal heating element which generates heat by absorption of microwave radiation, use for this purpose being made of a ferrite ceramic. Thus, the interior of the food is heated by the microwave energy absorbed thereby, while at the same time the exterior of the food is thermally heated and scorched by the plate which is heated by the ferrite heating element.

A similar arrangement is shown in U.S. Pat. No. 4,496,815, in which a microwave browning utensil includes a metal platter on which the food to be heated in the microwave oven is placed. On the underside of the platter is a thermal heating element formed by powdered ferrite dispersed in a matrix of organic material. In this way, the interior of the food on the platter which absorbs microwave energy is heated and cooked, while the exterior of the food is thermally heated and browned. Thermal heating takes place mainly by conduction; hence, the exterior of a body being heated is first subjected to the heat before it penetrates the interior of the food body, whereas with microwave heating, the radiation penetrates the interior of the body.

U.S. Pat. No. 4,266,108 discloses the use of a ferrite adjacent a microwave reflecting member in which the ferrite material acts as a heating element that will rise in temperature to a predetermined level which depends on the Curie point of the ferrite.

The Curie point of a ferrite is the temperature marking the transition between ferromagnetism and paramagnetism. When in its ferromagnetic state, the ferrite then absorbs microwave energy and is heated thereby. This action ceases when the ferrite enters its paramagnetic state. Hence, when a ferrite heating element is placed in a microwave oven and is subjected to microwave energy, the heating element will become increasingly hot until an elevated temperature is reached that depends on the Curie point of the ferrite, after which no more heat is generated even though the microwave oven is still operating. Thus, the ferrite heating element will effectively be turned "off," even though the microwave oven is still "on."

SUMMARY OF INVENTION

In view of the foregoing, the main object of this invention is to provide a mold assembly usable by children to produce molded play pieces in a microwave oven.

More particularly, an object of this assembly is to provide a mold assembly formed by a mold having shaped cavities to receive a flowable plastic molding composition, and a thermal heating element associated with the mold having ferrites dispersed therein which absorb microwave energy, whereby the heating element acts to thermally heat the molding composition to its curing temperature to produce solid plastic play pieces.

A significant advantage of the invention is that no skill is required on the part of the child who carries out the molding operation, for the child is only required to fill the cavities of the mold assembly with a plastic molding composition and to place the mold in the microwave oven which is then turned on.

Also an object of the invention is to provide a safety container having a releasable cover for enclosing the mold assembly without interfering with the molding operation being carried out in the microwave oven, which cover, when the container is removed from the oven while the mold assembly therein is still hot, is automatically released only when the assembly has cooled to a degree where it is safe to handle.

Still another object of the invention is to provide a mold assembly and a safety container therefor that can be mass produced at low cost.

Briefly stated, these objects are attained in a mold assembly for use by children to produce in a microwave oven plastic play pieces. The assembly includes a mold non-reactive to microwave energy, provided with shaped cavities for receiving a flowable, plastic molding composition non-reactive to microwave energy and having a predetermined curing temperature. Underlying the cavities is a thermal heating element formed by microwave energy-absorbing ferrite particles dispersed in an inert matrix. The particles have a Curie point higher than the curing temperature of the molding composition so that the heating element heats the composition in the mold cavities to effect curing and hardening thereof, thereby forming the play pieces.

The mold assembly is enclosed within a safety container non-reactive to micro-wave energy. The container is provided with a removable cover and a temperature-responsible latching mechanism which releases the cover to permit withdrawal of the mold assembly only when its temperature is reduced to a level at which it is safe to handle.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

The Mold Assembly

Figure 1:
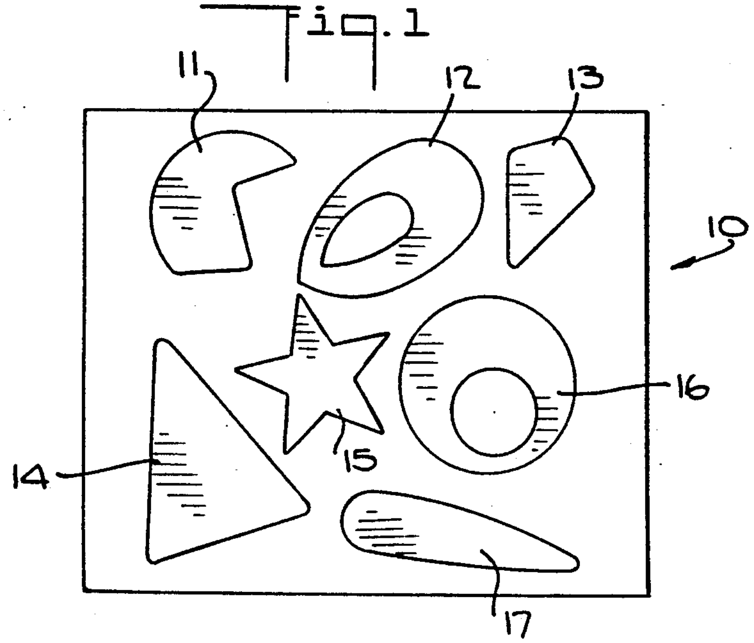
FIG. 1 is a top view of a mold assembly in accordance with the invention.
Figure 2:
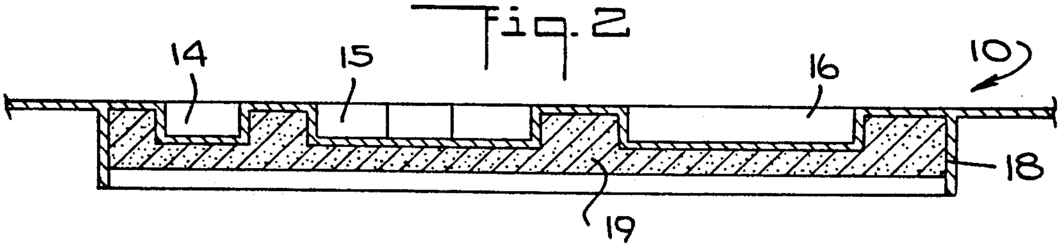
FIG. 2 is a longitudinal section taken though the mold assembly.
Figure 3:
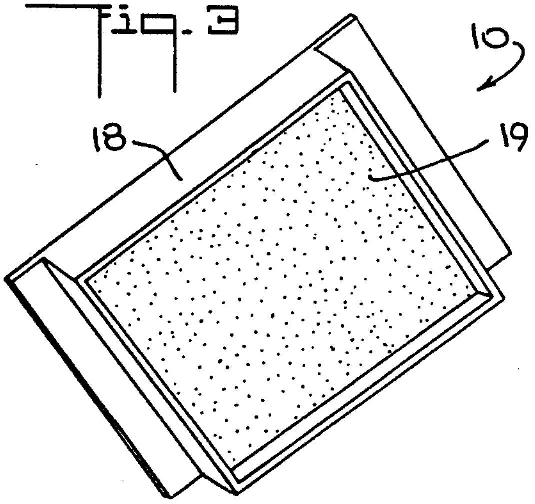
FIG. 3 is a bottom view of the assembly.
Figure 4:
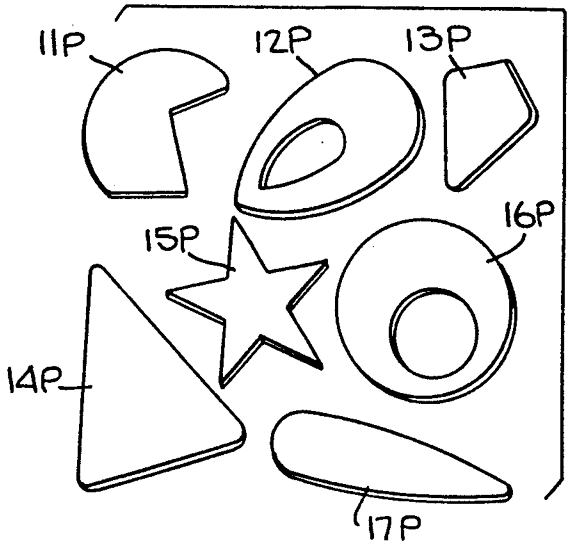
FIG. 4 illustrates the molded plastic play pieces produced by the mold assembly.
Figure 6:
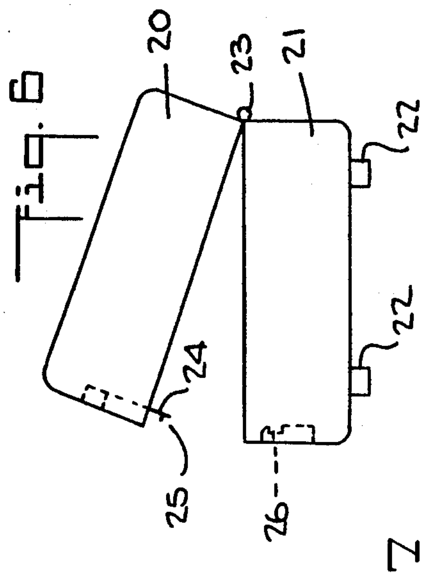
FIG. 6 illustrates the container in its unlatched condition.

Referring now to FIGS. 1, 2 and 3, there is shown a mold assembly in accordance with the invention, the assembly including a rectangular mold 10 having differently shaped mold cavities 11 to 17 therein adapted to create plastic play objects 11P to 17P of the same size and shape, as shown in FIG. 4.

Mold 10 is preferably die cast of zinc, for this metal is non-reactive to microwave energy, yet has a high coefficient of thermal conductivity. However, in practice other metals or non-metallic materials may be used as long as they are non-reactive to microwave energy and are unaffected by the temperatures at which the molding operation is conducted.

Mold 10 is constituted by a face plate in which the cavities are indented, and a rectangular base frame 18 integral with the face plate and surrounding the cavities which are depressed below the plane of the face. Lying within the frame is a thermal heating element 19 in the form of a matrix layer of epoxy material which conforms to the cavities and is bonded to the underside of the face plate. Dispersed in the epoxy matrix layer, which is non-reactive to microwave energy, are fine ferrite particles which are reactive and absorb microwave energy.

The term "ferrites" refers to magnetic oxides containing iron as a major component. It is the high electrical resistivity of ferrites that distinguish them from magnetic metals. The three most common groups of ferrites are those characterized as spinels, garnets and hexagonal ferrites. The spinel ferrites have the chemical formula $MeFe_2O_4$. The garnet ferrites have the general formula $3MeO_25Fe_2O_3$, while the composition of hexagonal ferrites include barium. Available ferrites have Curie temperatures in the range of about 80° C. to over 500° C.

Since in the present invention the ferrite used are those creating a heating element that will generate a temperature somewhat higher than the curing temperature of the plastic molding compound, the choice of ferrite depends on this curing temperature. Thus, when the molding composition is a plastisol having a curing temperature of 250° F., then the ferrite incorporated in the heating element must have a Curie point somewhat above 250° F., such as 300° F.

Hence, when the mold cavities 11 to 17 are filled by a child with plastisol, and the mold assembly is then placed in a microwave oven, the ferrite heating element 19 which absorbs microwave energy will heat up until the 300° F. Curie point is reached, at which point no microwave energy continues to be absorbed by the ferrite heating element, even though the microwave oven is still in operation.

The invention is not limited to the use of a plastisol as the molding compound, for other available molding compositions may be used. Many of these compositions have curing temperatures of between 200 to 275 degrees F., and a ferrite heating element which uses a ferrite having a Curie point of about 300° F. is then suitable for the mold assembly.

The Safety Container

A safety container in accordance with the invention, which is adapted to protectively enclose the mold assembly without interfering with molding operations, has a box-like form constituted by complementary upper and lower sections 20 and 21. These are interhinged on one side, so that the upper section functions as a cover that can be raised to admit or withdraw the mold assembly.

The container is molded of polypropylene or other plastic material non-reactive to microwave energy and unaffected by the elevated temperature produced in the molding operation. The sections are perforated to expedite cooling of the mold assembly after the container is removed from the microwave oven. And lower section 21 is provided with feet 22 which raise the container above the surface on which it is placed. The hinge 23 for the container is a living hinge of the same plastic as the container itself.

At the front of upper section 20 of the container is a temperature-sensitive bimetallic strip 24 whose upper end is anchored on this section and whose lower end 25 which extends into lower section 21 is in a hook formation that is engageable by a non-metallic catch 26 on the lower section. When the temperature of the strip is raised as a result of heat produced by the heating element of the assembly, strip 24 then bends in to cause hook 25 to engage catch 26, thereby latching the container. But when the mold assembly is close to room temperature and is safe to handle, the strip bends out to unlatch the container.

Operation

Figure 7:
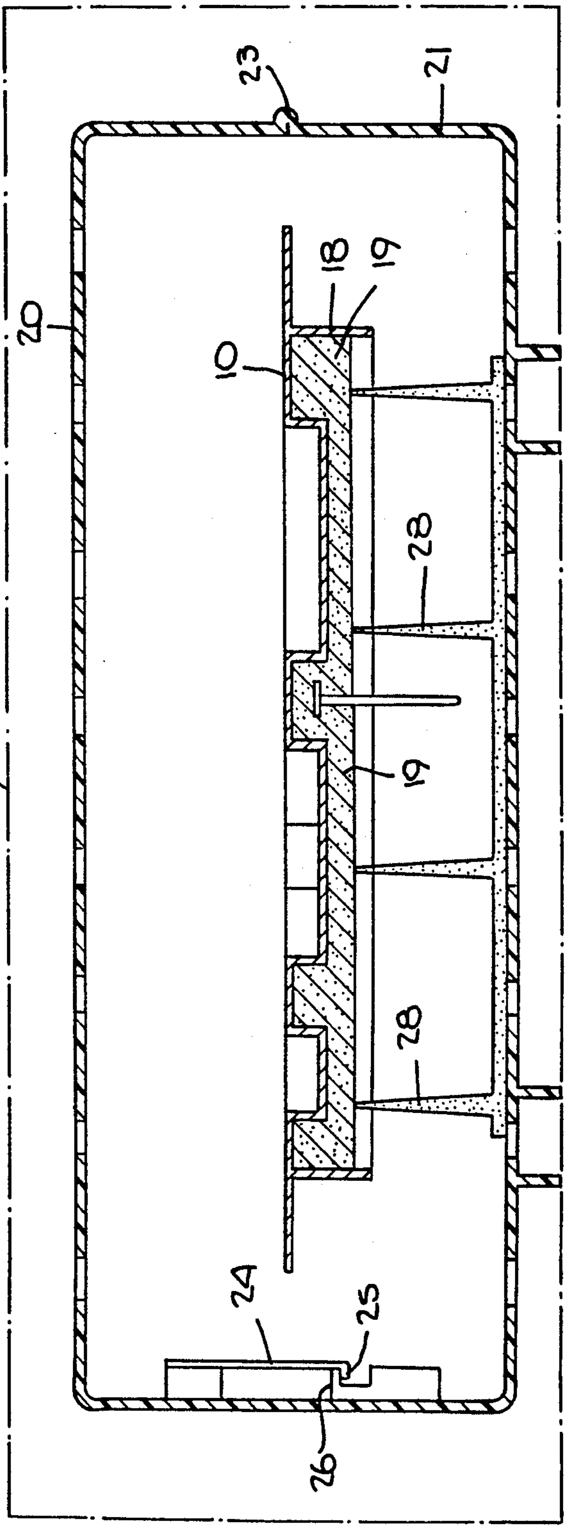
FIG. 7 schematically illustrates the mold assembly enclosed within the container placed in a microwave oven.
Figure 5:
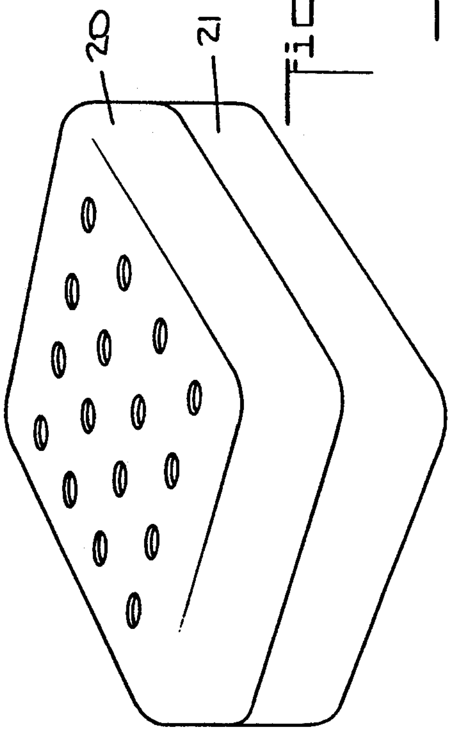
FIG. 5 shows, in perspective, a safety container for the assembly in its latched condition.

FIG. 7 shows an operating microwave oven, represented by block 27, within which is placed the mold assembly constituted by mold 10 and heating element 19, the assembly being enclosed in the safety container formed by sections 20 and 21.

The mold assembly rests within the container on a platform 28 formed by an array of standoff insulators of synthetic plastic material having a low coefficient of thermal conductivity so that the heat produced by thermal heating element 19 is mainly conducted to mold 10 and not diverted to the container. The plastic insulator material must be such as to remain solid at 350° F., so as not to be rendered molten or soft by heat produced by the ferrite heating element 19 which, in the example given, has a Curie point of 300° F. and does not rise in temperature above this point.

Before the mold assembly is put into the microwave oven, its cavities are is filled by a child with a plastisol or other plastic molding composition whose curing temperature is somewhat below the temperature produced by the heating element.

The plastic molding composition in the cavities is insensitive to microwave energy, but is raised in temperature by heating element 19. When the temperature of the composition reaches its curing temperature, the composition then cures and hardens. The temperature of the ferrite heating element does not rise upon the Curie point of the ferrite, for above this point, the ferrite will not absorb microwave energy.

The child who puts the loaded container in the microwave oven and then turns on the oven does not know how long it takes to complete the molding operation; that is, three to five minutes, or whatever time it takes for curing to take place.

But if the microwave oven is set for, say, 7 minutes of operation (assuming that the molding compound is a plastisol), then at the end of this time, molding will have been completed. No danger exists in running the microwave oven for a longer period, for the heating element of the mold assembly effectively cuts off when the Curie point of the ferrite is reached.

The heat produced by the heating element not only acts to heat the metal mold and the molding compound in the cavities, but also the bimetallic element which then acts to latch the container while it is within the microwave oven. But the container itself remains relatively cool.

When the oven shuts off, the child removes the loaded latched container from the oven and then either puts it in a pan of water to cool rapidly, or allows it to cool more slowly in air. When the mold assembly is sufficiently cool, the container will unlatch automatically and the child can then remove the mold assembly therefrom and detach the molded plastic play pieces from the mold cavities.

The cavity shapes and the resultant plastic play pieces which are shown in the drawing, are by way of example only. In practice, a child may be provided with a set of mold assemblies, each having a different group of mold cavities, so that the child can create a large number of play pieces of different sizes or shapes. Or a mold assembly may have only a single large cavity to produce a fanciful figure rather than a geometric forms.

While there has been shown and described a preferred embodiment of a mold assembly and a safety container therefor in accordance with the invention, it will be appreciated that many changes and modifications may be made therein without, however, departing from the essential spirit thereof.

I claim:

1. A mold assembly for use by children to produce in a microwave oven, having a settable timer, shaped plastic play pieces, said assembly comprising;

(a) a mold insertable in the microwave oven formed of a material non-reactive to microwave energy, said mold having at least one cavity therein receiving a plastic molding composition for forming a shaped play piece, said composition having a predetermined curing temperature; and (b) a heating element associated with the mold formed by an inert matrix having ferrite particles dispersed therein which absorb microwave energy and which have a Curie point somewhat above said curing temperature of said composition received in the cavity, whereby the element acts to thermally heat the mold to raise the temperature of the composition to its curing temperature to produce said plastic play piece, said heating element absorbing microwave energy and heating up until the Curie point is reached, at which point no microwave energy is absorbed even though the microwave oven continues to operate for a pre-set time.

2. An assembly as set forth in claim 1, in which the mold is formed of zinc.

3. An assembly as set forth in claim 1, in which the mold is formed by a rectangular plate below which is a base frame integral with the plate, said cavity being indented in the plate and being surrounded by the frame.

4. An assembly as set forth in claim 3, in which the matrix of the heating element is disposed within the frame and conforms to the cavity.

5. An assembly as set forth in claim 4, wherein the matrix is an epoxy adhesive which is bonded to the plate.

6. The assembly as set forth in claim 1, in which the composition is a plastisol having a curing temperature of about 250° F. and the ferrite has a Curie point of about 300° F.

* * * * *